2,700,614
METHOD OF PACKING CRANBERRY SAUCE

Clarence G. Critzman, Burlingame, Calif., and Randall Royce, Maywood, Ill., assignors to American Can Company, New York, N. Y., a corporation of New Jersey No Drawing. Application July 31, 1952, Serial No. 301,992

8 Claims. (Cl. 99—186)

The present invention relates to a method of packing whole cranberry sauce and more particularly refers to a method of packing cranberry sauce in which the berries are contained in a slightly gelled syrup.

An object of the invention is the provision of a method of preparing a whole cranberry sauce in which the syrup is gelled slightly by pectin leached from the berries and distributed throughout the syrup.

Another object is the provision of a method of preparing a whole cranberry sauce having a minimum of loose tough skins and a slightly gelled medium in which the berries are suspended.

Numerous other objects and advantages of the invention will be apparent as it is better understood from the following description which is of a preferred embodiment thereof.

These and other objects are effected by bursting or rupturing the skins of the berries, leaching out a portion of the pectinaceous or gelling materials from the fruit without substantial breakdown of the fruit and distributing the pectinaceous or gelling material throughout the liquid in the packaged product to form a gel in the syrup upon cooling of the container contents.

Heretofore, whole cranberry sauce has been packed by the "kettle" or "batch" method in which cranberries, a sugar and water are blended in a kettle prior to filling into containers and heat processing. The mixture is generally heated to hasten solution of the sugar and extract color from the berries. In order to maintain a fairly uniform ratio between liquid syrup and berries, the product is stirred constantly while it is being filled into containers. This combination of heat and stirring has an undesirable effect on the finished product. Prolonged heating causes a portion of the pectin of the berries to break down or at least to substantially reduce its gelling ability, such that the syrup or liquid portion of the sauce may become rather watery. The stirring breaks a fairly high proportion of the berries with the result that many free tough skins from which the fruit is completely removed are contained in the sauce.

In carrying out our new method the rupturing or bursting of the cranberries can be effected either mechanically or by subjecting clean, raw, whole berries to heat or a combination of the two. In one procedure, the berries are exposed to flowing steam at atmospheric pressure for a period of from about 1 to 10 minutes. By this treatment the skins of some of the berries are split or ruptured due to the expansion of the inner contents, but only a very minor proportion of fruit is separated from its skin. This heating treatment can be performed by filling a required amount of berries into an empty container and passing the container through a steam chamber, such as an exhaust box. Alternately, an equally effective method is to place the berries into stainless steel baskets and suspend them in a stream of flowing steam, or the raw berries can be spread on a belt or other conveyance in relatively thin layers and passed through a steam chamber. By this treatment not all of the berries are burst or split. In a fair proportion, however, this result does occur.

The action of the steam serves the multiple function of breaking the skin of the cranberries and wilting the berries and removing the air and other gases therefrom.

The step of rupturing or bursting the skin of the cranberries can also be carried out mechanically. The means employed for this purpose include piercing, cutting and partial crushing.

A piercing, puncturing or perforating operation can be easily accomplished by machines similar to those used for pitting cherries but with shorter and smaller diameter piercing needles or they can be rotary units in which at least one cylinder has a series of outwardly projecting piercing needles on its periphery and means for stripping the pierced cranberries therefrom. The piercing needle may be adjusted to penetrate the opposed skin surfaces or it may penetrate only one surface.

Properly adjusted and spaced cutting knives can be used to rupture the skins, but the depth of the cut should be regulated, so as to preclude exudation of large amounts of protoplasmic material from the cranberries. The knives may be either of the rotary, reciprocating or stationary type.

Partial crushing of the cranberries can be effected by passing them between properly spaced rolls or between properly spaced pressure belts. If this method of breaking the skin is employed, the pressure exerted on the cranberries should be just sufficient to rupture the skin without squeezing out the inner contents of the fruit.

Individual cranberries often vary considerably in size, and for that reason it may be desirable in some cases to size grade the fruit and break the skins of each size separately.

Cranberries with mechanically broken skins are steam treated from 1 to 10 minutes in a manner to that already described for the purpose of wilting and driving out air and metabolic gases from the fruit.

To the requisite amount of ruptured and wilted cranberries is added a syrup composed of a saccharine material, such as cane sugar and water. We found that a 60° Brix sucrose syrup is most satisfactory, but other sugar syrups serve equally well as sweeting materials. Filled containers are hermetically sealed, preferably while the product is hot, and subjected to a heat process at a temperature of from 212° to 230° F. for a time sufficient to sterilize the product and achieve other desired results. Usually a period of from 10 to 20 minutes at 212° F. or its equivalent at a higher temperature is adequate for a No. 2 can.

Another method of attaining sterility is to fill hot, ruptured, wilted cranberries into a can, add a syrup near its boiling temperature and hermetically seal the container immediately. The closing temperature of the product should be at least 180° F. and preferably between 185° F. and 200° F. When this procedure is followed it is generally necessary to invert the container and hold it in this position for about 3 minutes to sterilize the cover.

Upon completion of the heating period, the containers are cooled to room temperature. This is best effected by water cooling, but air or other liquid cooling procedure is also satisfactory.

There are thus two heat transfer cycles, one in which the temperature of the container contents is increased to approximately that of the heating medium and the other in which the temperaure of the container contents is increased to approximately that of the heating medium and the other in which the temperature of the heated contents are reduced to approximately that of the cooling medium, which may be water or other liquid or air. During at least one of these heat transfer cycles a part of the pectinaceous or gelling material is leached out of the cranberries and distributed uniformly throughout the syrup without substantial breakdown of the cranberries themselves. This is best done by agitating the sealed containers while the product is still at an elevated temperature, preferably at 175° F. or above. Agitation and heating, however, each serve more than one purpose. For example, the heat acts to destroy microorganisms that may be present in the sealed container. It also serves to increase the solubility rate of pectin, or other gelling material, from the interior of the fruit, or, in other words, to leach out the pectins from the protoplasmic mass more rapidly. Agitation increases the heat transfer rate and also serves to distribute the leached pectinaceous or gelling material throughout the liquid phase of the syrup.

Substantially comparable results are obtained regardless of whether agitation takes place during the heat sterilizing process, during the period between processing and cooling, or during the cooling cycle alone, or during any combination of those periods. It therefore becomes a matter of choice as to which point in the procedure the agitation occurs, provided such agitation takes place while the product is still at an elevated temperature.

The rate of agitation is not especially critical, but it should not be substantially less than about 10 R. P. M. nor greater than that at which the centrifugal force equals or exceeds the force of gravity. The container can be agitated by axial rotation, by end over end rotation, by reciprocation or oscillation through an arc, or by any combination of these agitating means.

It is believed that our improved process works as follows:

The steam or mechanically ruptured cranberries permit the liquid syrup to gain access to and leach out at least a portion of the gel forming material from the fruit. The pectins or gelling ingredients of the cranberries are more soluble at high temperatures than at room temperature. Consequently, a greater amount of pectin is removed from the burst berries at the high temperatures than would be possible by a syrup held at room temperature.

By agitating the containers the syrup moves throughout the entire contents of the can, and in so doing, does not have any localized points at which the pectin concentration reaches a saturation stage and thus, a maximum amount of pectin can be leached from the berries in a relatively short period of time. Further, the agitation distributes the pectin fairly evenly through the entire liquid phase of the product and is present in sufficient concentrations to impart a slight gel to the finished material at room temperature. The limited exposure of the pectin or gelling material to heat does not seriously alter its gelling ability.

By this treatment the effect of the agitation is not so severe as to remove substantial amounts of protoplasmic material from the ruptured berries and therefore there are very few loose skins in the product. As a result, the product at room temperature consists of a majority of cranberries with ruptured or broken skins, some whole cranberries and very few free skins, all suspended in a gel-like matrix.

It is thought that the invention and many of its attendant advantages will be understood from the foregoing description, and it will be apparent that various changes may be made in the steps of the process described and their order of accomplishment without departing from the spirit and scope of the invention or sacrificing all of its material advantages, the process hereinbefore described being merely a preferred embodiment thereof.

We claim:

1. A method of packing whole cranberry sauce comprising, subjecting raw syrup free cranberries to a heat treatment sufficient to rupture and wilt a major proportion of the cranberries, adding an edible syrup to the cranberries, heat processing the mixture of syrup and cranberries in a sealed container for a time and at a temperature sufficient to sterilize the product, leaching out sufficient gelling material from the cranberries and distributing it through the liquid phase of the mixture by agitation of the container while the cranberries are at an elevated temperature and cooling the container and its contents, whereby a slight gel is effected in the syrup on cooling.

2. A method of packing whole cranberry sauce comprising exposing raw syrup free cranberries to steam to rupture the skins of and wilt a major proportion of the cranberries, adding an edible syrup to the steamed cranberries, heat processing the mixture of syrup and cranberries in a sealed container for a time and temperature sufficient to sterilize said mixture, leaching out a portion of the natural gelling materials contained in the cranberries while said cranberries are at an elevated temperature and distributing the gelling materials throughout the liquid phase of the product, said leaching and distributing of gelling materials being effected by agitating a said sealed container while the product is at a temperature of at least 175° F., thereby producing a slight gel in the syrup on cooling.

3. A method of packing whole cranberry sauce comprising, exposing raw whole syrup free cranberries to flowing steam for a period of from about 1 to 10 minutes to burst the skins of and wilt a major proportion of the cranberries, filling the steamed cranberries and a saccharine syrup into a container, hermetically sealing said filled container, subjecting the sealed container to a heat sterilizing cycle and a cooling cycle, and leaching a portion of the natural gelling materials from the cranberries and distributing said materials throughout the syrup by agitating the container during at least one of said cycles and while the product is at an elevated temperature, thereby effecting a slight gel in the syrup upon cooling of the product to room temperature.

4. A method of packing whole cranberry sauce comprising exposing raw syrup free cranberries to flowing steam for a period of from 1 to 10 minutes to burst the skins of a portion of the cranberries, filling the steamed cranberries and a sugar syrup into a container, hermetically sealing the filled container, subjecting the container and its contents to a heat sterilizing process and leaching and distributing a portion of the gelling materials of the cranberries by agitation of the container during said process, thereby forming a gel in the syrup upon cooling of the container contents to room temperature.

5. A method of packing whole cranberry sauce comprising exposing raw syrup free cranberries to flowing steam for a period of from 1 to 10 minutes to burst the skins of and wilt a portion of the steamed cranberries, filling the steamed cranberries and a sugar syrup into a container, hermetically sealing the filled container, subjecting the container and its contents to a heat sterilizing process and leaching and distributing a portion of the gelling materials originally contained in the cranberries by agitation of the container after completing said sterilizing process and before cooling the contents, thereby forming a slight gel in the syrup on cooling of the product to room temperature.

6. A method of packing whole cranberry sauce, comprising exposing raw syrup free cranberries to flowing steam for a period of from 1 to 10 minutes, filling steamed cranberries and a sugar syrup into container, sealing the filled container and subjecting the filled container and its contents to a heat sterilizing and a cooling cycle, leaching out a portion of the gelling materials from the cranberries and distributing said materials throughout the syrup by agitation of the container during the cooling cycle while the temperature of the product is at a temperature of at least 175° F., to effect a slight gel in the syrup when the sauce is at room temperature.

7. A method of packing whole cranberries comprising breaking the skin of a major proportion of raw syrup free cranberries, adding an edible syrup to the so treated cranberries, heat processing the mixture of syrup and treated cranberries in a sealed container for a time and a temperature sufficient to sterilize the product, leaching out sufficient gelling material from the cranberries and distributing said material throughout the liquid phase of the mixture by agitation of said sealed container while the product is at an elevated temperature and cooling the container and its contents, whereby a slight gel is effected in the syrup on cooling.

8. A method of packing whole cranberries comprising piercing the skin of a major proportion of raw syrup free cranberries, wilting the pierced cranberries, adding an edible syrup to the pierced and wilted cranberries, heating the mixture of the syrup and pierced and wilted cranberries in a hermetically sealed container for a time and at a temperature sufficient to sterilize said mixture, leaching sufficient gelling material from the cranberries and distributing said material throughout the liquid phase of said mixture by agitation of said sealed container while the product is at a temperature at least as high as 175° F. and cooling the container and its contents, to produce a slight gel in the liquid phase of the product.

References Cited in the file of this patent

UNITED STATES PATENTS

| 37,058 | Sampson | Dec. 2, 1862 |
| 117,256 | Campbell | July 25, 1871 |
| 1,271,847 | Buhles | July 9, 1918 |
| 2,529,514 | Roberts et al. | Nov. 14, 1950 |

OTHER REFERENCES

"Everybody's Cookbook," by Lord, revised edition, Harcourt, Brace and Company, New York, pages 394 and 404.